United States Patent [19]

Tamura et al.

[11] 3,874,819

[45] Apr. 1, 1975

[54] FRANCIS TYPE RUNNER FOR PUMP TURBINE

[75] Inventors: Ryoichi Tamura; Masayasu Okada, both of Hitachi; Mituo Takase; Masahiro Yamabe, both of Mito, all of Japan

[73] Assignee: Hitachi, Ltd., Tokyo, Japan

[22] Filed: May 9, 1973

[21] Appl. No.: 358,548

[30] Foreign Application Priority Data

May 12, 1972  Japan.................................... 47-356

[52] U.S. Cl............................. 416/186, 415/163
[51] Int. Cl................................................ F01d 5/04
[58] Field of Search ............ 416/186; 415/163, 175

[56] References Cited
UNITED STATES PATENTS

| | | | |
|---|---|---|---|
| 963,378 | 7/1910 | Lorenz | 416/186 |
| 1,509,653 | 9/1924 | Kaplan | 416/186 |
| 3,398,696 | 8/1968 | Sproule | 415/175 X |
| 3,436,055 | 4/1969 | Lindquist | 415/163 UX |
| 3,574,473 | 4/1971 | Gaffal | 415/175 X |
| 3,639,072 | 2/1972 | Munkstrand | 415/163 UX |
| 3,639,080 | 2/1972 | Yamabe | 416/186 |
| 3,692,422 | 9/1972 | Girardier | 416/186 X |

FOREIGN PATENTS OR APPLICATIONS

| | | | |
|---|---|---|---|
| 316,854 | 12/1919 | Germany | 416/186 |
| 863,788 | 1/1941 | France | 416/186 |

*Primary Examiner*—Everette A. Powell, Jr.
*Attorney, Agent, or Firm*—Craig & Antonelli

[57] ABSTRACT

A Francis type runner unit for a pump-turbine comprising a runner secured to a main shaft of the turbine and including a plurality of blades, a crown ring disposed above said blades and a shroud ring disposed beneath said blades, and a runner cone secured to said runner. Said runner cone has a curved lower end portion curved inwardly at a break point and is shaped so that L lies within the range of from $0.35D_2$ to $2.5D_2$ where L is the distance between the line passing through the center of the height of the outer end of said blades and a point in the vicinity of the break point in the curved lower end portion of said runner cone, and $D_2$ is the inner diameter of the outlet end of said shroud ring. In the runner unit, the ratio $D_3/D_2$ is selected to lie within the range of $0<D_3/D_2<0.12$ where $D_3$ is the outer diameter of the curved lower end portion of said runner cone at the break point, so as to reduce vibrations and noises occurring in the runner.

8 Claims, 8 Drawing Figures

FRANCIS TYPE RUNNER FOR PUMP TURBINE

BACKGROUND OF THE INVENTION

This invention relates to improvements in the structure of Francis type runners for pump turbines.

It is commonly known that, during operation of a Francis turbine under a partial load, especially under a load which is about 50 % of the rated output, a cavity or vacuum tends to be created in the central zone of the inlet portion of the draft tube due to instability of water flow discharged from the runner and this results in generation of violet vibrations and noises in the pump-turbine. The growth and disappearance of this cavity are repeated in the draft tube and a vortex core is provided thereby. The position of the cavity produced in the central zone of the inlet portion of the draft tube is not fixed at all and the cavity moves from one position to another in the central zone of the inlet portion of the draft tube. In an effort to reduce this undesirable cavitation, admission of air into the central zone has been proposed already. However, provision of means for supplying air into the central zone in large amounts results inevitably in an expensive construction and unreliable operation. Further, the admission of air adversely affects the output of the turbine frequently.

A Francis type runner for a water turbine is known in which the remote end of the runner cone is extended toward the draft tube beyong the plane of the blades. Further, an attempt is also known according to which fluid-passing openings are bored in the base portion and remote end portion of the runner cone in water turbines for forming a circulating passage for the circulation of fluid between the hollow space within the runner cone and the space around the runner cone thereby minimizing the undesirable cavitation.

Vibrations occur also in a Francis type runner for pump-turbines. However, the structure of the runner cone for the Francis type runner in water turbines cannot be directly applied to that for pump-turbines. This is due to the fact that the Francis type runner in the pump-turbine differs from the Francis type runner in the water turbine in the following points:

a. The number of blades of the Francis type runner in the former turbine is 6 to 7, whereas that in the latter turbine is 12 to 20. Therefore, more turbulence occurs in the flow of water in the draft tube due to the above difference in the number of runner blades.

b. The length of the blades in the former turbine is 2 to 5 times that of the blades in the latter turbine. Therefore, water flowing through elongated ducts between the runner blades tends to flow out completely along the runner blades and a forced vortex tends to appear in the former turbine, whereas the outgoing flow is affected by the inlet of the runner and by the guide vanes in the latter turbine.

c. In the latter turbine, an air supply pipe can be connected to the remote end of the runner cone since water flows always downward from above. In the case of the former turbine, the flowing direction of water is reversible, and therefore, such a pipe cannot be connected to the runner cone because the runner and guide vanes may be damaged in the event of breakage of the pipe.

SUMMARY OF THE INVENTION

It is an object of the present invention to provide a Francis type runner unit for a pump-turbine which can operate with a high degree of safety by virtue of reductions in the vibrations and noises occurring during operation of the pump turbine under a partial load as a water turbine.

Another object of the present invention is to provide a Francis type runner unit for a pump-turbine in which the undesirable cavitation occurring in the inlet portion of the draft tube can be minimized thereby preventing undesirable reductions of the efficiency of operation.

Still another object of the present invention is to provide a Francis type runner unit for a pump-turbine having improved means which can be simply and easily applied with a short period of time of work not only to newly manufactured Francis type runners but also to Francis type runners of existing pump-turbines for obviating vibration and noise troubles encountered heretofore.

Yet another object of the present invention is to provide a Francis type runner unit for a pump-turbine in which the shape of the remote end of the runner cone is improved for reducing vibrations and noises occurring in the turbine.

In accordance with one aspect of the present invention, there is provided a Francis type runner unit for a pump-turbine comprising a runner secured to a main shaft of the turbine and including a plurality of blades, a crown ring disposed above said blades and a shroud ring disposed beneath said blades, and a runner cone secured to said runner, said runner cone having a curved lower end portion curved inwardly at a break point and being shaped so that L lies within the range of from $0.35D_2$ to $2.5D_2$ where L is the distance between the line passing through the center of the height of the outer end of said blades and a point in the vicinity of the break point in the curved lower end portion of said runner cone, and $D_2$ is the inner diameter of the outlet end of said shroud ring, wherein the ratio $D_3/D_2$ is selected to lie within the range of $0<D_3/D_2<0.12$ where $D_3$ is the outer diameter of the curved lower end portion of said runner cone at the break point.

In accordance with another aspect of the present invention, there is provided a Francis type runner unit for a pump turbine comprising a runner secured to a main shaft of the turbine and including a plurality of blades, a crown ring disposed above said blades and a shroud ring disposed beneath said blades, and a runner cone secured to said runner, said runner cone having a substantially planar remote end and being shaped so that L lies within the range of from $0.35D_2$ to $2.5D_2$ where L is the distance between the line passing through the center of the height of the outer end of said blades and the remote end of said runner cone, and $D_2$ is the inner diameter of the outlet end of said shroud ring, wherein the ratio $D_3/D_2$ is selected to lie within the range of $0<D_3/D_2<0.12$ where $D_3$ is the outer diameter of the remote end of said runner cone.

Other objects, features and advantages of the present invention will be apparent from the following detailed description taken in conjunction with the accompanying drawings.

BRIEF DESCRIPTION OF THE DRAWING

FIGS. 5a and 5b are a velocity diagram and a diagrammatic view respectively for illustrating the operation of the runner unit according to the present invention.

DESCRIPTION OF THE PREFERRED EMBODIMENTS

Figure 1:
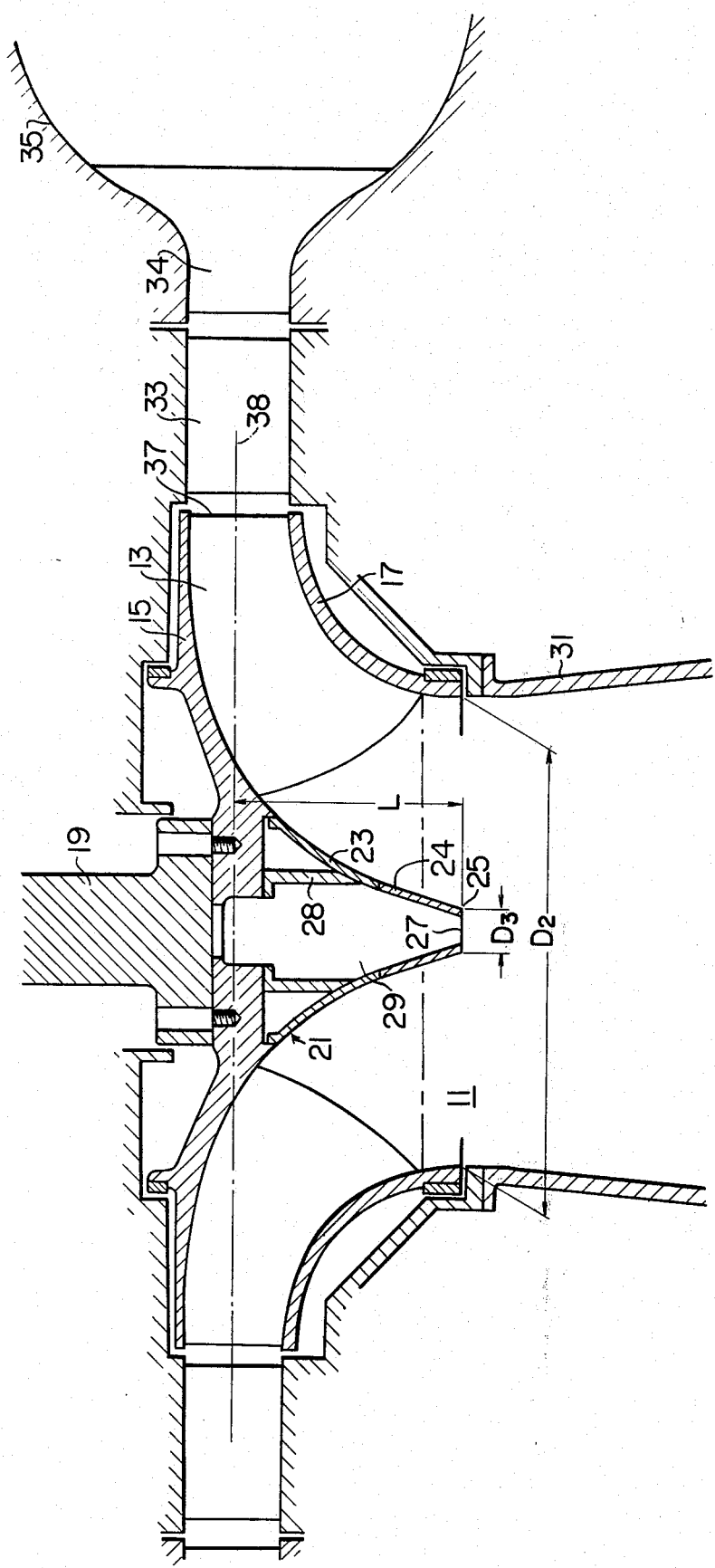
FIG. 1 is a vertical section of parts of a pump-turbine equipped with a Francis type runner unit embodying the present invention.

Referring to FIG. 1, a pump-turbine runner 11 is composed of a plurality of blades 13, a crown ring 15 disposed above the blades 13, and a shroud ring 17 disposed beneath the blades 13 as is commonly known. This runner 11 is secured to a main shaft 19 of the turbine by being fastened by bolts. A runner cone 21 is secured to the runner 11 and is composed of an upper member 23 adjacent to the runner 11 and a lower member 24 remote from the runner 11. These members 23 and 24 are formed from a flat plate and are welded together. The use of such flat plate facilitates the manufacture of the runner cone and is especially effective for improving the existing equipment. However, the present invention is in no way limited to a runner cone of flat plate construction as above described and a casting or curved plate may be employed in lieu of the flat plate.

Figure 2:
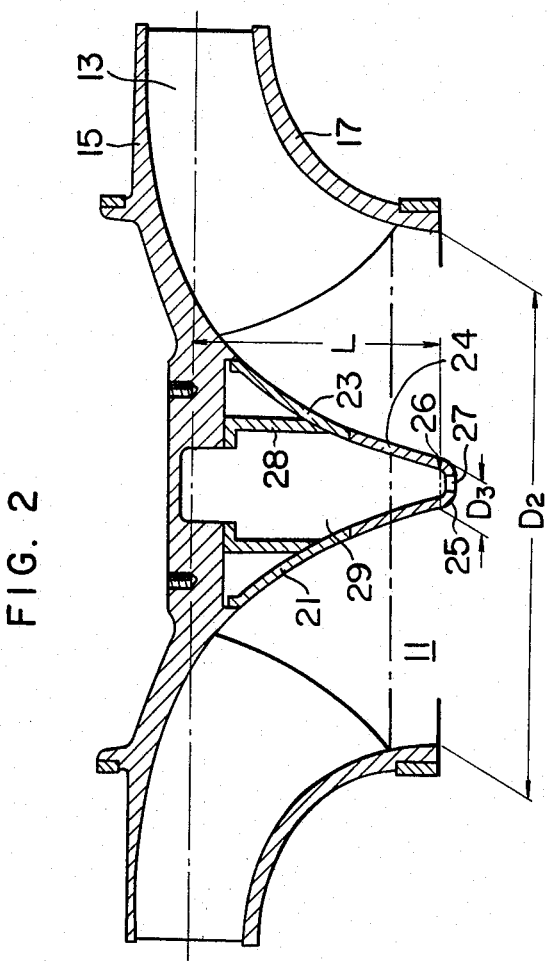
FIG. 2 is a vertical section of parts of another embodiment of the present invention.

In the present embodiment, the remote end 25 of the runner cone 21 is flat in shape and an opening 27 is provided in the remote end 25 for lowering the water level during starting. As shown in FIG. 1 and 2, the remote end 25 of the runner cone 21 protrudes beyond a lone passing through the lowermost ends of the blades 13 toward a draft tube 31 described more fully hereinafter. The upper member 23 is reinforced by a reinforcing member 28. Due to such a shape, a hollow space 29 is defined within the runner cone 21. A draft tube 31 is disposed at the outlet of the runner 11, and means including guide vanes 33, a speed ring 34 and a casing 35 are disposed at the inlet of the runner 11. FIG. 2 shows a modification in which the remote end 25 of the runner cone 21 has a curved shape, and other components are the same as those shown in FIG. 1.

In FIG. 1, L is the distance between the line 38 passing through the center of the height of the outer end 37 of the blades 13 and the remote end 25 of the runner cone 21, $D_2$ is the inner diameter of the outlet end of the shroud ring 17 adjacent to the draft tube 31, and $D_3$ is the outer diameter of the remote end 25 of the runner cone 21. The present invention is applied to a Francis type runner unit for a pump-turbine of the kind having a relatively long runner cone in which the distance L above specified lies within the range of from $0.35D_2$ to $2.5D_2$. In the case of FIG. 2, the break point 26 of the curved contour at the lower part of the runner cone 21 corresponds to the remote end 25 in FIG. 1. In this case too, therefore, the distance L between the line 38 and the break point 26 should lie within the range of from $0.35D_2$ to $2.5D_2$ as in the above case. However, a slight deviation of the range of L from the above-specified range is allowable, and herein, L is defined as a distance from the line 38 to a point in the vicinity of the break point 26. Thus, the present invention is also intended for application to a Francis type runner unit for a pump-turbine of the kind having a relatively long runner cone as shown in FIG. 2 in which the distance L lies within the range of from $0.35D_2$ to $2.5D_2$. The present invention aims at reliably eliminating undesirable vibrations and noises occurring in such a pump-turbine.

Figure 3:
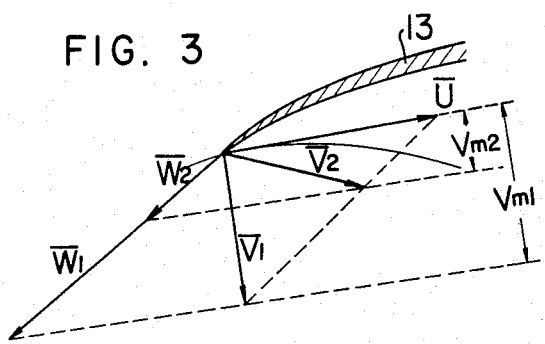
FIG. 3 is a velocity diagram showing velocity components at the outlet end of a blade.

The inventors have made a theoretical study and experiment on the pump-turbine of the kind above described. FIG. 3 shows one of the blades 13 of the runner 11 having a shape as shown in FIG. 1 and 2. Referring to FIG. 3, when the runner 11 is rotating at a constant speed during operation of the pump-turbine as a primemover, the outlet portion of the runner blade 13 is moving at a circumferential speed $\overline{U}$. In the normal operation in which a sufficient quantity of water is flowing through the turbine, the vertical component $V_m$ of the absolute velocity of water is large as shown by $V_{m1}$ in FIG. 3. Thus, the absolute velocity of water is given by $\overline{V_1} = \overline{U} + \overline{W_1}$ where $W_1$ is the relative velocity of water flowing along the blade 13, and $V_1$ is substantially perpendicular with respect to U. It will be seen that, in this case, water leaving the runner 11 flows out without whirling. On the other hand, in a partial load condition in which the quantity of water is small, the vertical component $V_m$ of the absolute velocity of water is reduced as shown by $V_{m2}$ in FIG. 3 and the absolute velocity of water is now given by $\overline{V_2} = \overline{U} + \overline{W_2}$. In such a case, water flows out while being greatly deflected toward the direction of $\overline{U}$, hence the circumferential direction, and water leaving the runner 11 whirls in the direction of $\overline{U}$, hence in the circumferential direction around the center of the draft tube 31. Such phenomenon, of course, occurs in the area where the blades 13 are present. Accordingly, it is presupposed that, where such phenomenon is present, the remote end 25 of the runner cone 21 protrudes beyond the line passing through the lowermost ends of the blades toward the draft tube 31 in order to permit water to flow smoothly. And it is to be seen that the following description involves the reduction of vibration in the pump-turbine on the basis of the above-stated presuppositions.

Figure 4A:
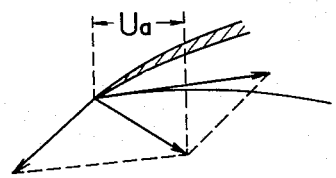
FIGS. 4a and 5b are a velocity diagram and a diagrammatic view respectively for illustrating the operation of a prior art runner unit.
Figure 4B:
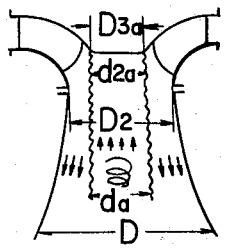

Suppose now that U is the component of the absolute velocity $\overline{V_2}$ of water in the direction of $\overline{U}$, hence in the circumferential direction, and we will discuss the case in which the outer diameter $D_3$ of the remote end 25 is large or $D_{3a}$ and the case in which $D_3$ is small or $D_{3b}$. In FIGS. 4a and 4b, suppose that $\omega_{2a}$ is the angular velocity of a forced vortex produced at the outlet of the runner 11 due to the circumferential velocity component $U_a$ of water in the case in which $D_3$ is large or $D_{3a}$, and $d_{2a}$ is the diameter of the core of the vortex. As taught by hydrodynamics, the diameter $d_a$ of the vortex core and the angular velocity $\omega_a$ of the vortex when this vortex flows down to reach a position at which it has a diameter D are given by $$d_a^2 = D^2 - D_2^2 + d_{2a}^2$$

$$\omega_a = \frac{\omega_{2a}}{1 + \frac{D^2 - D_2^2}{d_{2a}^2}}.$$

Figure 5A:
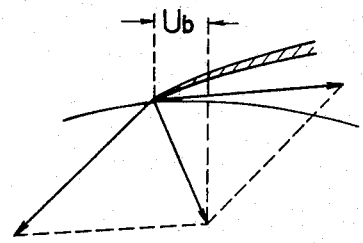
Figure 5B:
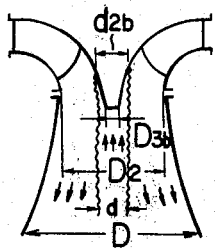

In FIGS. 5a and 5b showing the case in which the diameter $_bd_3$ of the remote end 25 is small or $D_{3b}$, the diameter $d_b$ of the vortex core and the angular velocity $\omega_b$ of the vortex are similarly given by $$d_b^2 = D^2 - D_2^2 + d_{2b}^2$$

$$\omega_b = \frac{\omega_{2b}}{1 + \frac{D^2 - D_2^2}{d_{2b}^2}}$$

The energy $E_a$ in the vortex core when the outer diameter $D_3$ of the remote end 25 is large or $D_{3a}$ is given by $$E_a = \frac{\pi \rho d_{2a}^3 \omega_{2a}^2}{48}$$

where $\rho$ is the specific gravity of water. Similarly, the energy $E_b$ in the vortex core when the outer diameter $D_3$ of the remote end 25 is small or $D_{3b}$ is given by $$E_b = \frac{\pi \rho d_{2b}^3 \omega_{2b}^2}{48}$$

Therefore, the ratio between $E_b$ and $E_a$ is $$\left(\frac{E_b}{E_a}\right) \left(\frac{d_{2b}}{d_{2a}}\right)^3 \left(\frac{\omega_{2b}}{\omega_{2a}}\right)^2$$

The area of water flowing at a point considerably distant from the outlet of the runner 11 in the case of FIG. 4 will be compared with the area of water flowing at the same part in the case of FIG. 5b. The comparison therebetween proves that the vertical component $V_m$ of the absolute velocity of water is greater in the latter case than in the former case due to the fact that the area of flowing water is smaller when the runner cone 21 is longer. Thus, $U_b$ is less than $U_a$ and the vortex at the runner outlet is less. In other words, $d_{2b}$ and $\omega_{2b}$ are less than $d_{2a}$ and $\omega_{2a}$ respectively. Therefore, $E_b$ is less than $E_a$ and less vibration is produced.

The pressure difference $\Delta P_a$ between the pressure at the outlet of the runner 11 and the pressure at the portion of the draft tube 31 corresponding to the diameter D in the case of FIG. 4b is given by $$\Delta P_a = \left\{ \left(\frac{d_{2a}\omega_{2a}}{2}\right)^2 - \left(\frac{d_a\omega_a}{2}\right)^2 \right\} \frac{1}{2g}$$

$$= \frac{d_{2a}^2 \omega_{2a}^2}{8g} \cdot \frac{D^2 - D_2^2}{D^2 - D_2^2 + d_{2a}^2}$$

The corresponding pressure difference $\Delta P_b$ in the case of FIG. 5b is given by $$\Delta P_b = \frac{d_{2b}^2 \omega_{2b}^2}{8g} \cdot \frac{D^2 - D_2^2}{D^2 - D_2^2 + d_{2b}^2}$$

Thus, the ratio between $\Delta P_b$ and $\Delta P_a$ is $$\left(\frac{\Delta P_b}{\Delta P_a}\right) \left(\frac{d_{2b}}{d_{2a}}\right)^2 \left(\frac{\omega_{2b}}{\omega_{2a}}\right)^2 \left(\frac{D^2 - D_2^2 + d_{2a}^2}{D^2 - D_2^2 + d_{2b}^2}\right)$$

In the pump-turbine, $D \geq D_2$ and $\omega_{2b} < \omega_{2a}$. Thus, the above ratio is expressed as $$\frac{\Delta P_b}{\Delta P_a} \leq \left(\frac{\omega_{2b}}{\omega_{2a}}\right)^2 < 1.$$

It will thus be seen that $\Delta P_b$ is less than $\Delta P_a$, and in the case of latter pressure difference, less counter flow occurs and vibrations can be reduced. After all, it is known that the vibrations can be reduced when $E_b < E_a$ and $\Delta P_b < \Delta P_a$, hence when $D_3$ is small and the runner cone 21 has a greater length.

Figure 6:
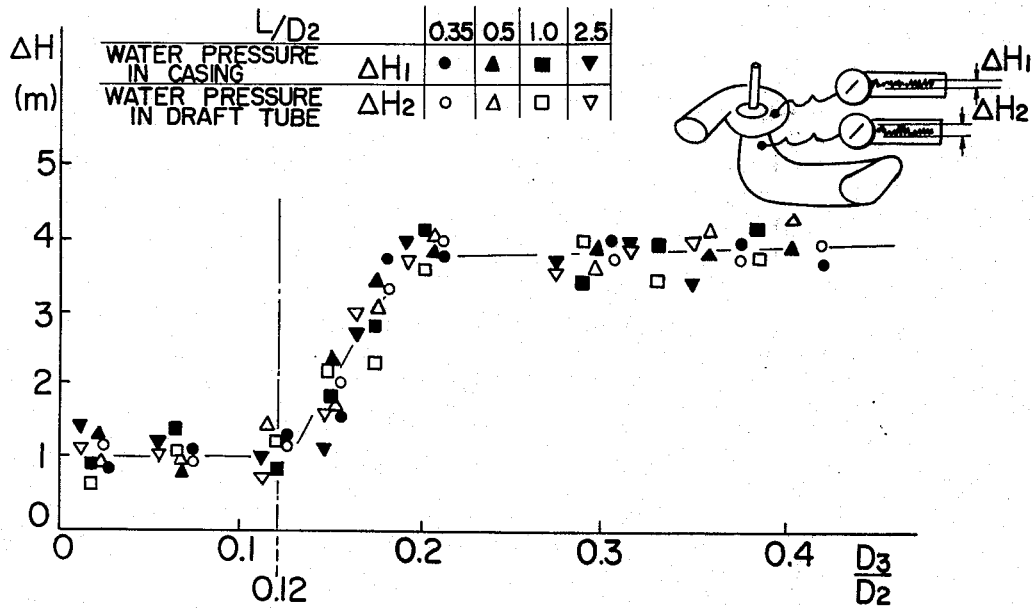
FIG. 6 is a graph showing the results of a test.

Taking into consideration the fact that the value of $D_3$ is important for preventing occurrence of undesirable vibrations and noises in the pump-turbine as described hereinbefore, the inventors have made an experiment on the Francis type runner unit shown in FIG. 1 in an effort to clarify a suitable range of the value of $D_3$ relative to $D_2$. The results of this experiment are shown in FIG. 6. It will be seen from FIG. 6 that variations $\Delta H_1$ of the water pressure in the casing and variations $\Delta H_2$ of the water pressure in the draft tube 31 are abruptly reduced in the range in which the ratio $D_3/D_2$ is less than 0.12. This range of the ratio $D_3/D_2$ is especially important for preventing undesirable vibrations and noises occurring in the pump-turbine. The vibration occurring when the ratio $D_3/D_2$ is 0.1 is very little or of the order of about 25% of the vibration occurring when the ration $D_3/D_2$ is 0.3. A test was conducted on a practical turbine manufactured by the applicant and designed to operate with a head of 111 meters, an output of 87,000 kilowatts and a rotating speed of 150 r.p.m. for measuring vibrations of the turbine. According to the results of measurement of the vibrations of the metal casing cover, the amplitude of vibrations was of the order of 8/100 mm, 6.5/100 mm and 6.0/100 mm when the ratio $D_3/D_2$ was 0.12, 0.10 and 0.09 respectively, whereas the amplitude of vibrations was of the order of 25/100 mm when the ratio $D_3/D_2$ was 0.3. It was thus proved that a remarkably improved runner cone could be obtained when the ratio $D_3/D_2$ was selected to be less than 0.12.

It is the essential feature of the present invention to select the ratio $D_3/D_2$ in a pump-turbine having a runner cone so that it lies within the range of less than 0.12. It is thus effective to select the ratio $D_3/D_2$ so that it lies within the range of from $0 < D_3/D_2 < 0.12$. Even when L lies within the range of from $0.35D_2$ to $2.5D_2$, any pump-turbines in which the ration $D_3/D_2$ is more than 0.12 or which do not include any runner cone having a remote end, hence $D_3 = 0$, are outside of the scope of the present invention.

We claim:

1. A Francis type runner unit for a pump-turbine comprising a runner secured to a main shaft of the turbine and including a plurality of blades, a crown ring disposed above said blades and a shroud ring disposed beneath said blades, a draft tube disposed at an outlet of the runner, and a runner cone secured to said runner, said runner cone having a substantially planar remote end and being shaped so that L lies within the range of from $0.35D_2$ to $2.5D_2$, said planar remote end protruding beyond a line passing through the lowermost ends of the blades toward the draft tube, where L is the distance between the line passing through the center of the height of the outer end of said blades and the remote end of said runner cone, and $D_2$ is the inner diameter of the outlet end of said shroud ring, wherein the ratio $D_3/d_2$ is selected to lie within the range of $0<D_3/D_2<0.12$ where $D_3$ is the outer diameter of the remote end of said runner cone.

2. A Francis type runner unit as claimed in claim 1, wherein said runner cone is of non-perforated construction and is composed of a plurality of planar members defining a hollow space within said runner cone.

3. A Francis type runner unit as claimed in claim 2, wherein said planar members are disposed so as to substantially form an arc and are fixed to each other while making successively smaller angles withe respect to the main shaft of the turbine.

4. A Francis type runner unit for a pump-turbine comprising a runner secured to a main shaft of the turbine and including a plurality of blades, a crown ring disposed above said blades and a shroud ring disposed beneath said blades, a draft tube disposed at an outlet of the runner, and a runner cone secured to said runner, said runner cone having a curved lower end portion curved inwardly at a break point and being shaped so that L lies within the range of $0.35D_2$ to $2.5D_2$, the curved lower end of said runner cone protruding beyond the line passing through the lowermost ends of the blades toward the draft tube, where L is the distance between the line passing through the center of the height of the outer end of said blades and a point in the vicinity of the break point in the curved lower end portion of said runner cone, and $D_2$ is the inner diameter of the outlet end of said shroud ring, wherein the ratio $D_3/D_2$ is selected to lie within the range of $0<D_3/D_2<0.12$ where $D_3$ is the outer diameter of the curved lower end portion of said runner cone at the break point.

5. A Francis type runner unit as claimed in claim 4, wherein said runner cone is of non-perforated costruction and is composed of an upper planar member, an intermediate planar member and a lower planar member defining a hollow space within said runner cone.

6. A Francis type runner unit as claimed in claim 5, wherein said upper, intermediate and lower planar members are disposed so as to substantially form an arc and are fixed to each other while making successively smaller angles with respect to the main shaft of the turbine.

7. A Francis type runner unit as claimed in claim 4, wherein the lower end portion of said runner cone substantially planar in shape.

8. A Francis type runner unit for a pump-turbine comprising a runner secured to a main shaft of the turbine and including a plurality of blades, a crown ring disposed above said blades and a shroud ring disposed beneath said blades, and a runner cone secured to said runner, said runner cone having a curved lower end portion curved inwardly at a break point and being shaped so that L lies within the range of from $0.35D_2$ to $2.5D_2$ where L is the distance between the line passing through the center of the height of the outer end of said blades and a point in the vicinity of the break point in the curved lower end portion of said runner cone, and $D_2$ is the inner diameter of the outlet end of said shroud ring, wherein the ratio $D_3/D_2$ is selected to lie within the range of $0<D_3/D_2<0.12$ where $D_3$ is the outer diameter of the curved lower end portion of said runner cone at the break point.

* * * * *